Jan. 18, 1938.　　　R. H. DRAEGER　　　2,105,475
CAMERA SHUTTER
Filed June 3, 1935
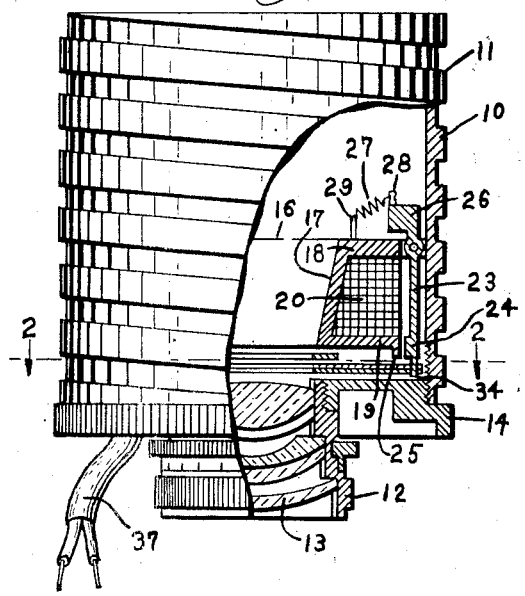
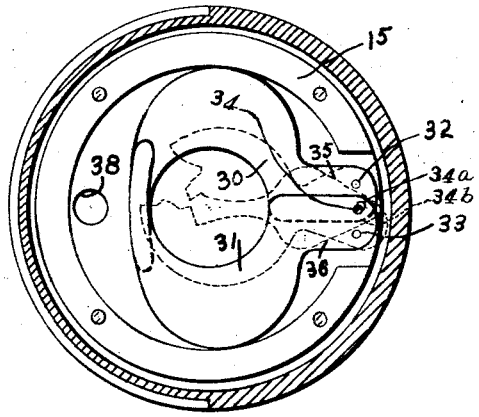
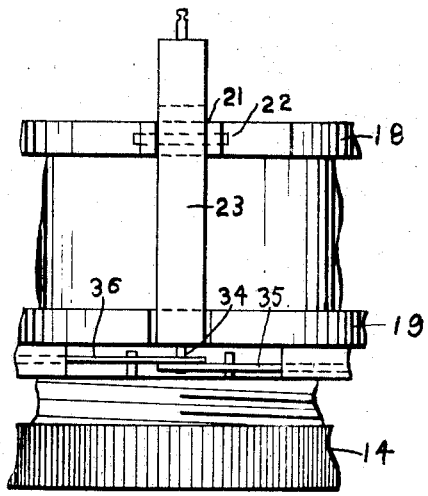
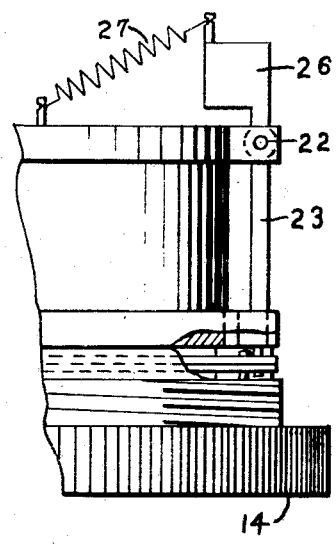
Inventor
Rupert H. Draeger
By John J. Fitzgerald
Attorney Patented Jan. 18, 1938

2,105,475

UNITED STATES PATENT OFFICE 2,105,475

CAMERA SHUTTER

Rupert H. Draeger, United States Navy

Application June 3, 1935, Serial No. 24,689

8 Claims. (Cl. 95—62)

(Granted under the act of March 3, 1883, as amended April 30, 1928; 370 O. G. 757)

This invention relates to a camera shutter and has for an object to provide an improved camera shutter which is to be electrically controlled.

There are many types of camera shutters well known in the camera art for various purposes, but the camera shutter of this invention is particularly intended to be electrically controlled and to be opened by passing an electric current through a suitably positioned electromagnet, the opening taking place against the force of a spring which will immediately reclose the shutter when the current ceases to actuate the armature of the electro-magnet.

The shutter of this invention is particularly intended for use in copying, enlarging or other similar types of camera, although it may equally well be used in any type of camera for making individual exposures.

The circuit to the shutter may be made a part of a general control circuit which may be used in cyclically operating the copying or enlarging camera.

The shutter is very simple, both in construction and operation, and is inexpensive to construct, due to the simplicity and small number of parts. This shutter is of such simplicity that only a single pair of shutter leaves is necessary in many instances for completely opening and closing the shutter aperture, although it will be understood that the number of pairs of shutter leaves may be increased in an obvious manner if desired. All movable parts of the shutter are completely enclosed within a lens carrying barrel, thereby making it possible to seal off the shutter from foreign particles such as atmospheric dust, moisture, or the like, and insuring long and trouble-free operation of the shutter. A further advantage is that the operating lever for the shutter is properly balanced so that it may be effectively operated, irrespective of the angle in which it may be positioned.

With the foregoing and other objects in view, as will hereinafter become apparent, this invention comprises the construction, combinations and arrangement of parts hereinafter disclosed, claimed and illustrated on the accompanying drawing herein.

Fig. 1 is an elevational, partly-broken-away view of the shutter of this invention;

Fig. 2 is a section line 2—2 of Fig. 1;

Fig. 3 is a fragmentary elevation of the shutter operating means taken from the rear; and, Fig. 4 is a side view of Fig. 3. There is shown at 10 the lens barrel which is threaded as at 11 for mounting the same in the camera. This lens barrel 10 carries the usual lens tube 12 and lens 13 of conventional construction, a flanged and threaded apertured disk 14 providing a support between the barrel 10 and the lens tube 12.

Supported on this disk 14 by means of a semicircular ring member 15 is a circular shaped electromagnet 16. This electromagnet 16 has a circular shaped core 17 provided with a centrally extending aperture through which the light rays may pass. This core 17 is provided with upper and lower externally extending flanges 18 and 19, the coil 20 being located about the core 17 and between the flanges 18 and 19. The flange 18 is slotted at 21 providing a recess for the lever 23 pivoted at 22 and acting as the armature for the electro-magnet 16. As will be observed, the lever 23 is thickened as at 24, adjacent to the lower flange 19, which is likewise extended somewhat as at 25 so as to provide a better path for the magnetic flux. The upper end of the lever 23 is formed into an integral weight 26 so as to completely balance the lever 23 in any position or angle on its pivot 22. A spring 27 secured to the lever as at 28 and anchored as at 29 tends to move the lever or armature 23 away from the electromagnet.

The pair of shutter leaves 30 and 31 are pivotally mounted on pins 32 and 33 on the disk 14. An integral pin 34 extending from the bottom of lever 23 passes through apertures 34a and 34b in the over-lapping edges of the shutter leaf arms 35 and 36. The shutter leaves 31 and 32 are crescent shaped and their bodies are so curved that when spread apart into contact with ring member 15 as a stop, there is an aperture provided therethrough of a size allowing all the light rays passing through the lens 13 to pass through this aperture and the aperture in the electromagnet 16 to the interior of the camera.

The leaves 30 and 31 will remain in the open position shown in Fig. 2 only while there is an electrical current passing through the conductor 37 to the coil 20 to energize the electromagnet and draw the armature lever 23 toward it, the conductor 37 being connected to the coil through the aperture 38 in disk 14, the aperture 38 being of such a size that the conductor 37 will fill it tightly and not allow any dust or light to pass therethrough. When the current is cut off after the shutter has been held open a sufficient time to make the necessary exposure, the spring 27 pivots the armature 23 so as to move the integral pin 34 away from the electromagnet, thereby moving both shutter leaves about their pivoted pins 32 and 33 in an overlapping, light-tight position, thus cutting off the exposure and getting the shutter ready for the next exposure the next time an electrical current is passed through the conductor 37.

The novel features and the operation of this device will be apparent from the foregoing description. While the device has been shown and the structure described in detail, it is obvious that this invention is not to be considered limited to the exact form disclosed, and that changes may be made within the scope of what is claimed without departing from the spirit of the invention.

The invention described herein may be manufactured and used by or for the Government of the United States of America for governmental purposes without the payment of any royalties thereon or therefor.

I claim:

1. A camera shutter comprising a pair of shutter leaves pivoted for movement to open-shutter or light-tight positions, and an electromagnetic means operating said shutter leaves to one of said positions, said electromagnetic means including a pivoted balanced armature lever having a pin extending therefrom and adapted to move said shutter leaves.

2. A camera shutter comprising a pair of shutter leaves pivoted for movement in the planes of said leaves to open-shutter or light-tight positions, an electromagnetic means operating said shutter leaves to one of said positions, said electromagnetic means including a pivoted balanced armature lever, and spring means normally returning said shutter leaves to the other of said positions.

3. A camera shutter comprising a pair of shutter leaves mounted for pivotal movement in the planes of said leaves between open-shutter and closed-shutter positions, an electromagnet for operating said shutter leaves to open-shutter position, and yieldable means for returning said shutter leaves to closed shutter position, said electromagnet having an aperture therethrough through which the light rays may enter the camera.

4. In a camera shutter mechanism including a lens barrel, a lens tube, a lens and means supporting said lens and lens tube in dust-tight arrangement with said lens barrel; a shutter and an electromagnet within said lens barrel for operating said shutter, said electromagnet being circular in outline and having an aperture therethrough through which the light rays may pass from the lens to the camera, and a pivoted armature operable by said electromagnet for moving the shutter to open-shutter position while a circuit is passing through the electromagnet.

5. In a camera shutter mechanism including a lens barrel, a lens tube, a lens and means supporting said lens and lens tube in dust-tight arrangement with said lens barrel; a shutter and an electromagnet within said lens barrel for operating said shutter, said electromagnet being circular in outline and having an aperture therethrough through which the light rays may pass from the lens to the camera, a pivoted armature operable by said electromagnet for moving the shutter to open-shutter position while a circuit is passing through the electromagnet, and spring means against which said armature is operated, said spring means returning the shutter to closed-shutter position when the circuit is discontinued.

6. In a camera shutter mechanism including a lens barrel, a lens tube, a lens and means supporting said lens and lens tube in dust-tight arrangement with said lens barrel; a shutter and an electromagnet within said lens barrel for operating said shutter, said electromagnet being circular in outline and having an aperture therethrough through which the light rays may pass from the lens to the camera, an armature trigger lever operable by said electromagnet for moving the shutter to open-shutter position while a current is passing through the electromagnet, and spring means against which said armature trigger lever is operated, said spring means returning the shutter to closed shutter position when the circuit is discontinued, said shutter including a pair of semicircular shaped shutter leaves and pivoting means for said shutter leaves and a common actuating pin centrally extending from said armature trigger lever through aligned apertures in the shutter leaf arms.

7. In a photographic camera, a lens barrel, a shutter lying in a single plane and an electromagnetic operating means mounted in said barrel, said means including an armature operatively connected with said shutter, and a support for said armature in said barrel outside of the plane of said shutter.

8. A photographic camera according to claim 7 and in which said armature is pivoted at a point outside the plane of the shutter, and a spring tending to rotate said armature around said pivot.

RUPERT H. DRAEGER.